US009880857B2

United States Patent
Shen et al.

(10) Patent No.: US 9,880,857 B2
(45) Date of Patent: Jan. 30, 2018

(54) SYSTEM FILE MANAGEMENT ON A STORAGE DEVICE

(71) Applicant: Seagate Technology LLC, Cupertino, CA (US)

(72) Inventors: Jin Quan Shen, Singapore (SG); Yong Peng Chng, Singapore (SG); Choon Kiat Tan, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 33 days.

(21) Appl. No.: 14/956,097

(22) Filed: Dec. 1, 2015

(65) Prior Publication Data

US 2017/0153901 A1    Jun. 1, 2017

(51) Int. Cl.
*G06F 9/44* (2006.01)
*G06F 1/00* (2006.01)

(52) U.S. Cl.
CPC .......... *G06F 9/4406* (2013.01); *G06F 9/4418* (2013.01); *G06F 1/00* (2013.01)

(58) Field of Classification Search
CPC ............... G06F 17/30091; G06F 21/34; G06F 17/30017; G06F 9/4402; G06F 9/4418; Y10S 707/99939; G06Q 20/3576
USPC .......................................................... 713/2
See application file for complete search history.

(56) References Cited

U.S. PATENT DOCUMENTS

| | | | | | |
|---|---|---|---|---|---|
| 5,469,573 | A | * | 11/1995 | McGill, III | G06F 11/1469 707/999.2 |
| 5,598,530 | A | * | 1/1997 | Nagae | G06F 11/1004 714/21 |
| 6,816,872 | B1 | * | 11/2004 | Squibb | G06F 17/30067 |
| 7,219,257 | B1 | * | 5/2007 | Mahmoud | G06F 11/1417 714/6.12 |
| 7,254,682 | B1 | * | 8/2007 | Arbon | G06F 11/1435 711/161 |
| 8,699,159 | B1 | * | 4/2014 | Malina | G11B 20/10305 360/31 |
| 9,128,820 | B1 | * | 9/2015 | Malina | G06F 3/0608 |
| 2006/0265437 | A1 | * | 11/2006 | Coulson | G06F 9/4418 |
| 2009/0024814 | A1 | * | 1/2009 | Eisler | G06F 11/2094 711/162 |
| 2009/0055817 | A1 | * | 2/2009 | Maj | G06F 8/65 717/173 |
| 2014/0122803 | A1 | * | 5/2014 | Kato | G06F 9/4418 711/118 |
| 2014/0200860 | A1 | * | 7/2014 | Jun | G06F 9/4418 703/1 |

* cited by examiner

*Primary Examiner* — Thomas Lee
*Assistant Examiner* — Santosh R Poudel
(74) *Attorney, Agent, or Firm* — Holzer Patel Drennan (57) ABSTRACT

A method or system comprises reading content of a plurality of system files from storage media of a storage device, generating a master storage device system file, and storing the master storage device system file on the storage media at a master system file location. The location of the master system file is provided to boot firmware or hardware. As a result, when the system boots up, the master system file is read into a temporary cache.

15 Claims, 7 Drawing Sheets

SYSTEM FILE MANAGEMENT ON A STORAGE DEVICE

BACKGROUND

As the requirements for data storage, retrieval, and analysis has increased, the need for cheaper and faster data storage devices has also increased. Data storage devices, such as disc drives, magnetic tapes, etc., store data on a different recording media using different storage technologies such as magnetic recording, optical recording, etc. Disc drives are widely used as data storage device in computing systems. Disc drives used in embedded systems include many internal files stored in internal storage to support system functions. For instance, in hard disc drives (HDD), there are many system information files, which are stored on a system zone of the HDD. Such files may store information, such as system defects, user defects, direct off scan (DOS), etc. These information is stored in various files that are allocated in system zone on different tracks of the HDD.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

A method or system comprises reading content of a plurality of system files from storage media of a storage device, generating a master storage device system file, and storing the master storage device system file on the storage media at a master system file location. The location of the master system file is provided to boot firmware or hardware. As a result, when the system bootup, the master system file is read into a temporary cache.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTIONS

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

Computing systems almost invariably use processors working with storage devices where the data used by the processor is stored on the storage devices. Example of storage devices for computing systems use hard disc drives (HDD), flash drives, or other tangible computer-readable storage media. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. Note that while the system for management of system files on a storage device is disclosed herein in context of an HDD, one or more aspects the technology disclosed herein may also be applicable to other storage devices enumerated above.

Computing systems often have storage media embedded therein. In embedded system, there are many internal files stored in internal storage to support system functions. When power is turned on for such embedded system, these files are read from internal storage one by one into system memory. Reading these files one by one takes long time so that impacts on time to ready (TTR). For an instance for a computing system with an HDD, there is system information that is stored on a system zone of the HDD. This information includes, for example, system defects, user defects, DOS (direct off line scan), Prizm/Zest etc. This information is stored in various files that are allocated in a system zone on different tracks of the HDD.

When power is turned on in an embedded system using the HDD, a controller of the HDD reads this information from the system zone into HDD memory. Such HDD memory may be implemented using DRAM, etc. A firmware SIM (system information manager) of the HDD controller interprets file locations, which consist of head/cylinder/sector numbers of the files. The HDD controller then issues a command to a servo to seek to file location and then read the file from HDD media to the HDD memory.

When the HDD controller reads each file separately by seeking to each of such files located at different locations within the HDD media, it takes time to seek to these files' media location, then takes one revolution time to read file out of media. For example, when power is turned on for the HDD, it may need to read many files out of disc media, which takes a long time. The HDD is generally unable to accept any host command until it has read all system files from distinct media locations and stored them on the HDD memory.

In one implementation of HDD, the HDD firmware includes a spin-up transition table that contains many entries. Each entry identifying location of an HDD system file and its associated buffer files in the HDD memory. Upon HDD power on, the HDD controller reads various HDD system files to its destination buffer file in the HDD memory. Each file read may require one seek and one revolution to read. As the number of such files increases, the number of seeks and revolutions also increase. This significantly increases the time-to-ready (TTR) of the HDD, which is the time it takes for the HDD to be ready to take host commands after power on.

For computing systems, such as notebooks, the TTR of the HDD (from power on to accept and execute first host command) is important. As more and more system information is added to the system files on the HDD media, it becomes more and more difficult for the HDD to meet the TTR as required by market.

The technology disclosed herein provides system for management of system files on a storage device so as to reduce the TTR. An implementation of such management system provides for reading content of many system files from the HDD media with only one seek and one revolution operation. By doing so, shorter TTR are realized and there is no additional impact on cost. Furthermore, such management system of system files also improves the HDD reliability. In one implementation, the management system constructs a large HDD system file (referred to herein as the "master HDD system file") during run time where such master HDD system file contains the content of many disparate HDD system files. Upon power on of the HDD, the master HDD system file is read in one revolution and copied to a temporary buffer in the HDD memory. Subsequently, the content related to each individual system file is copied from the temporary memory to the target buffer location in the HDD memory.

The master HDD system file is independent of individual HDD system files. As a result, if the master HDD system file is corrupted, the HDD controller can recreate the master HDD system file by reading the content from the individual HDD system files and recreating the master HDD system file, and may store such recreated master HDD system file at a different location in the system memory of the HDD. In effect, the master HDD system file provides redundancy to the individual system files, thus increasing the reliability of the HDD system.

Figure 1:
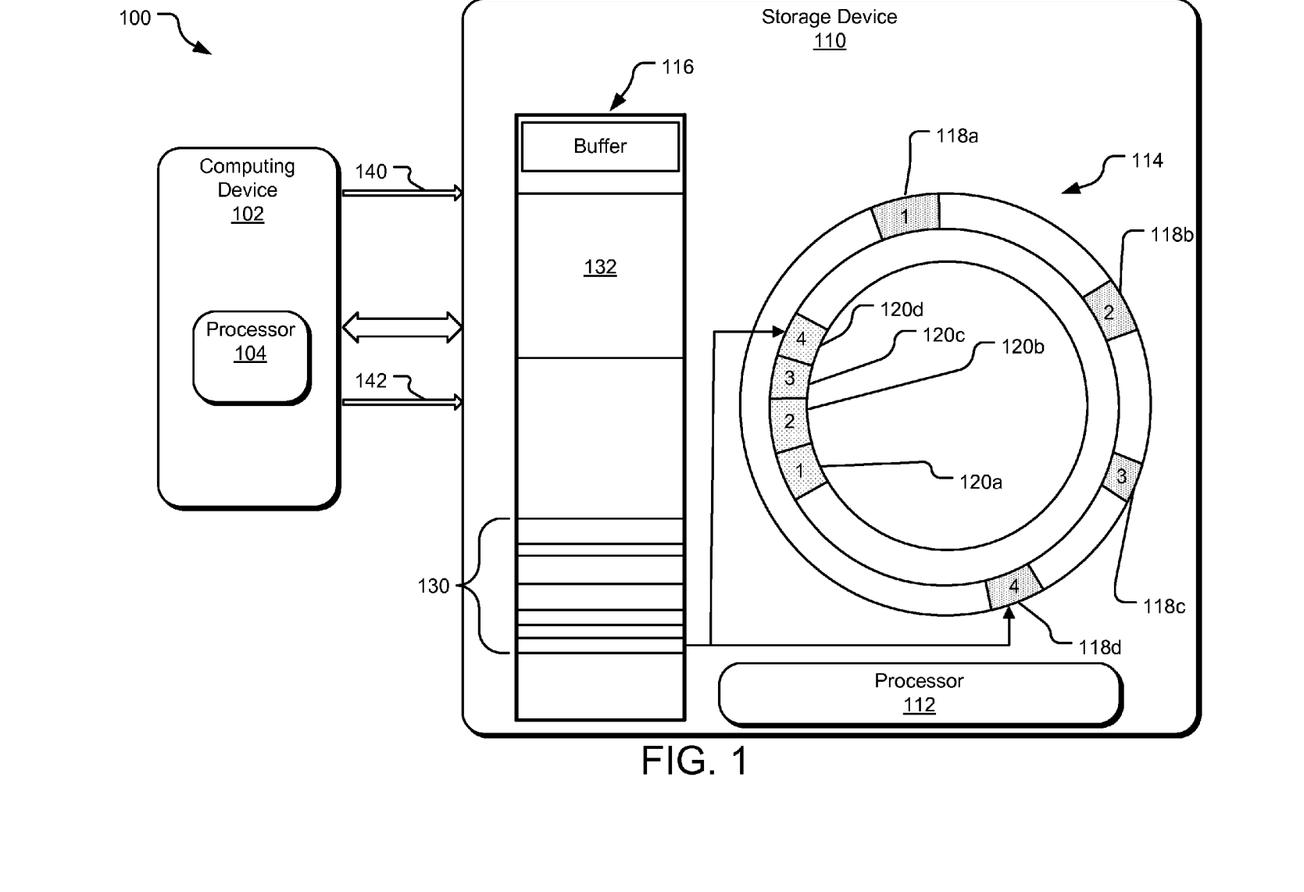
FIG. 1 illustrates an example block diagram of an implementation of a system for management of system files on a storage device.

FIG. 1 illustrates an example block diagram of an implementation of a system 100 for management of system files on a storage device. The system 100 includes a computing device 102 communicating with a storage device 110. The computing device may be, for example, a laptop, a desktop, a sever, a mobile device, a tablet device, etc. In the illustrated implementation, the storage device 110 is shown as being external to the computing device 102. However, in an alternative implementation, the storage device 110 may be internal to the computing device 102. The computing device 102 includes a processor 104 and may communicate with the storage device 110 via communication channels 140, 142.

The storage device 110 includes a processor 112, storage media 114, and a buffer memory 116. The buffer memory 116 may be volatile memory, such as RAM, etc. The storage media 114 may have a number of system files 118a-118d (hereinafter system files 118) stored in various parts of the storage media 114. For example, each of the system files 118 may include one or more information about the storage device 110. A transition table (not shown) located in the firmware of the processor 104 may include information about the system files 118, such as the location of each of the system files 118, the functionality of each of the system files 118, etc.

In the illustrated implementation, the processor 104 includes a computer program to read the content of the system files 118 into a master storage device system files 120a-d (master system file 120). In one implementation, the master system file 120 includes a copy of each of the system files 118. The master system file 120 may be created during normal operation of the system 100. For example, the master system file 120 is created during an idle time during the operation of the system 100. In one implementation, the master system file 120 is stored on a system area of the storage device 110. Once the master system file 120 is created a valid signature is written into a register of the processor 112. The operations for creating the master system file 120 are explained in detail below.

During boot up of the storage device 110, the boot up program of processor 104 checks the appropriate register of the processor 104 to determine if a master system file was created. If it determines that a master system file is created, the processor reads the master system file 120 into a temporary buffer 132. When the master system file 120 is read during a spin up transition, for each of the system files referred in the spin up table, the processor 104 checks if such system files have an image in the master system file 120. For example, the spin up table may refer to system files 118a, 118c, and 118d. In such a case, if each of these system files 118a, 118c, and 118d are in the master system file 120, the processor determines the location of such system files 118a, 118c, and 118d in the temporary buffer 132 and copies them to a destination buffer location 130.

Figure 2:
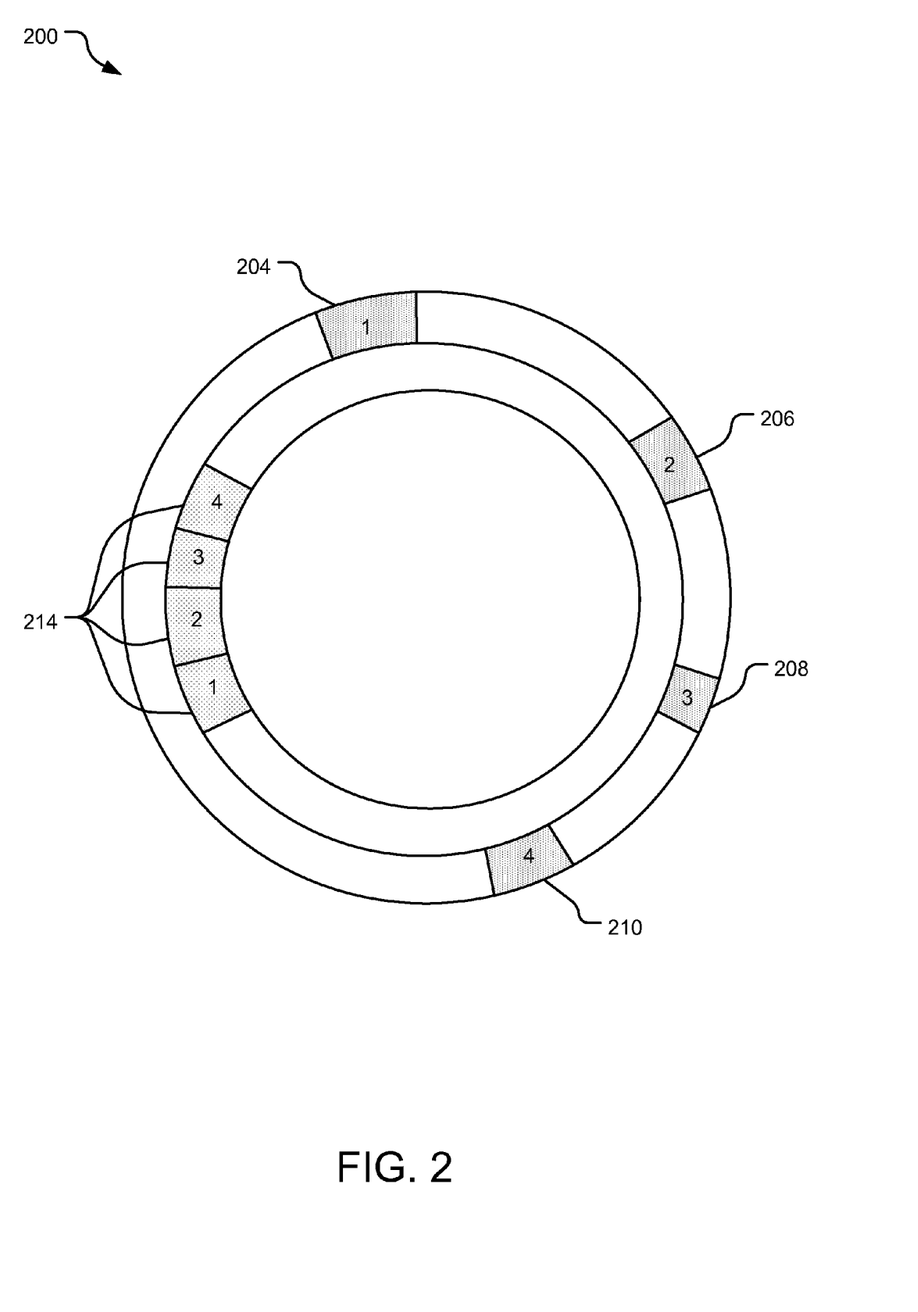
FIG. 2 discloses an expanded example block diagram of a storage media implementing the technology disclosed herein.

FIG. 2 discloses an expanded example block diagram of a storage media 200 implementing the technology disclosed herein. The storage media 200 includes a number of system files 204-210. A master system file 214 including an image of each of the system files 204-210 is stored in a system zone of the storage media 200.

Figure 3:
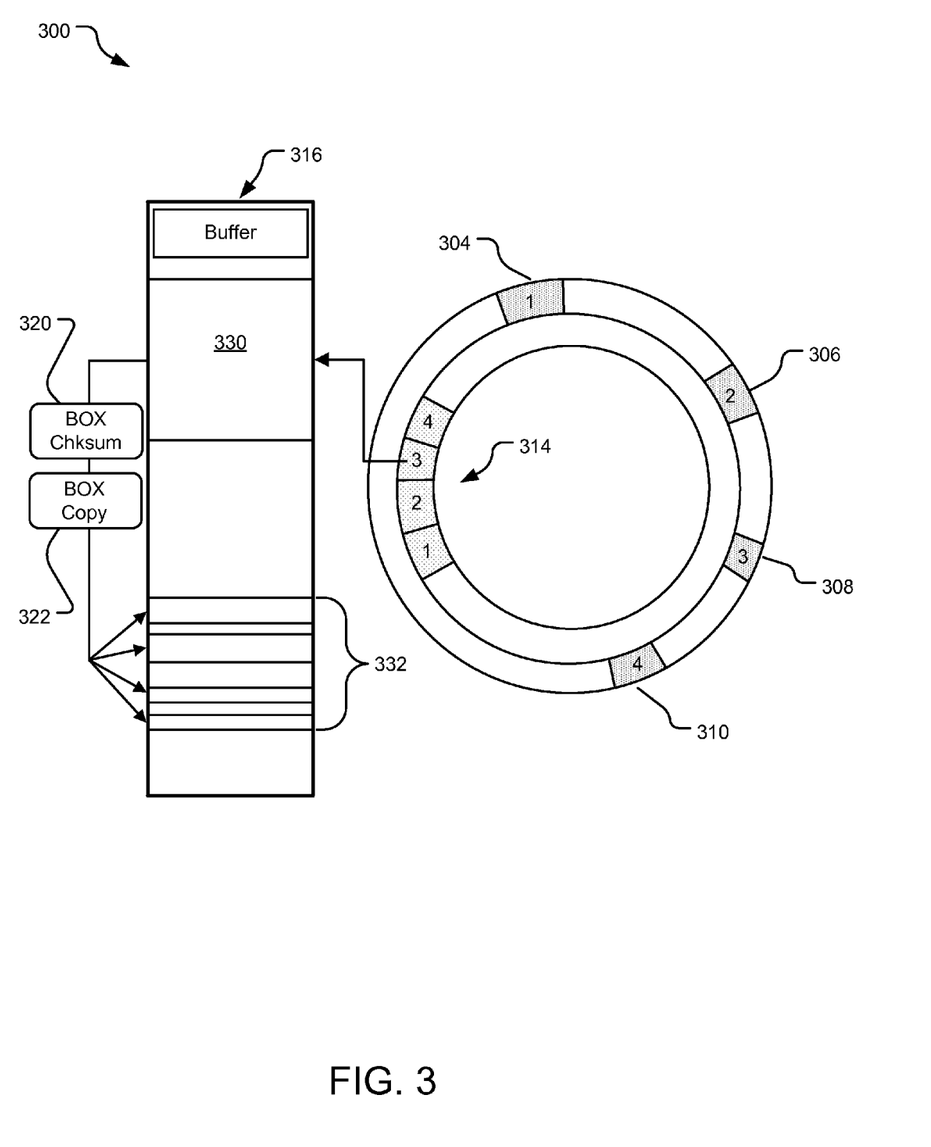
FIG. 3 discloses another example block diagram of a storage media implementing the technology disclosed herein.

FIG. 3 discloses another example block diagram of a storage media 300 implementing the technology disclosed herein. The storage media 300 includes a number of system files 304-310. A master system file 314 including an image of each of the system files 304-310 is stored in a system zone of the storage media 300. The storage media 300 also includes a buffer 316 including a temporary buffer 330 where an image of the master system file 314 is copied. A hardware copy engine copies each of the system files from the temporary buffer 330 to destination buffers 332 after performing a box checksum 320 and box copy 322. In such an implementation, the system files 304-310 are not read from the system media to be copied to the destination buffers 332.

Figure 4:
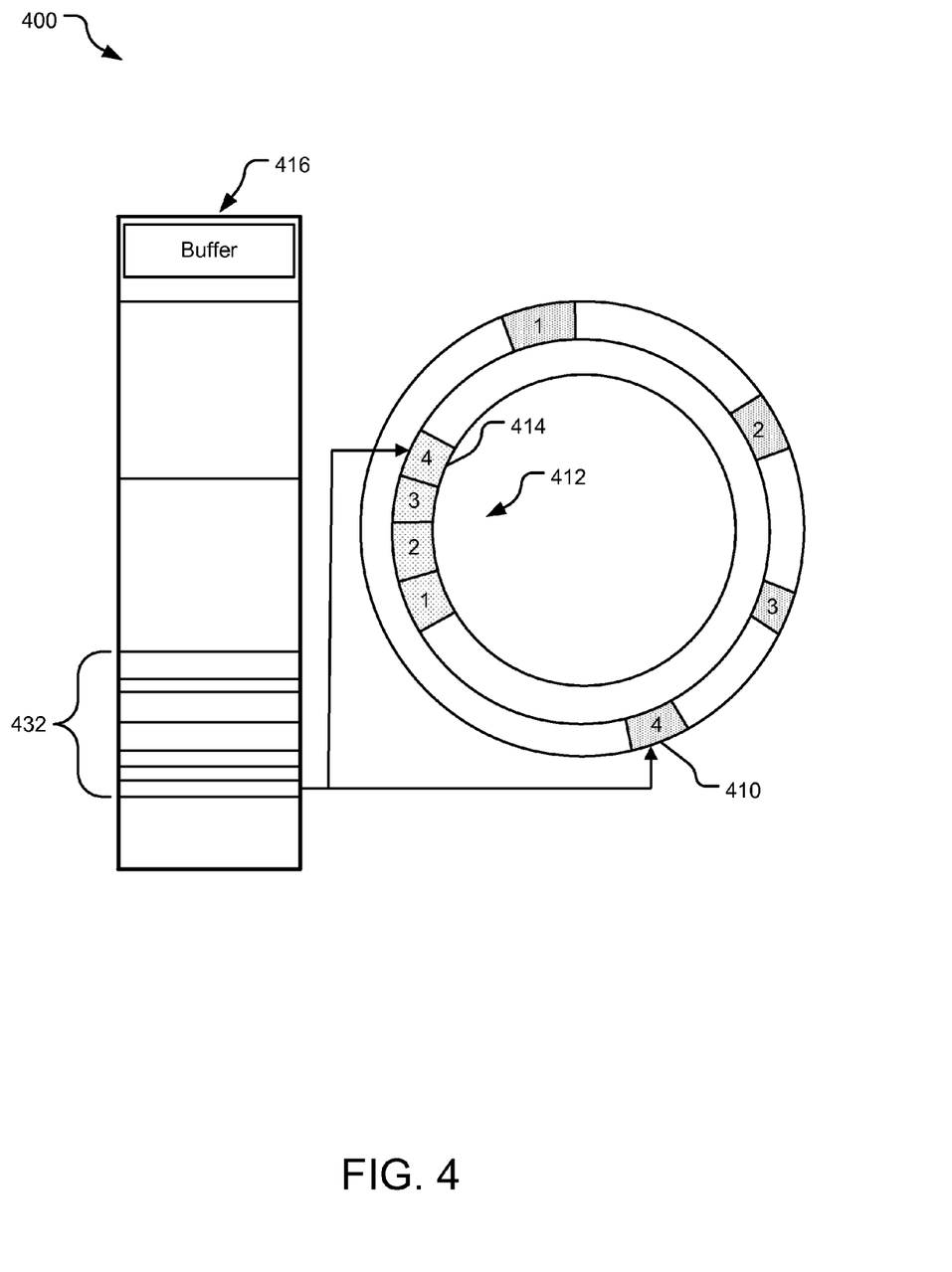
FIG. 4 discloses another example block diagram of a storage media implementing the technology disclosed herein.

FIG. 4 discloses another example block diagram of a storage media 400 implementing the technology disclosed herein. Specifically, the storage media 400 includes a system file 410 stored on the storage media and a copy 414 of the system file 410 located on a system zone of the storage media as part of a master system file 412. Copies of the system file 410 may be stored at a destination location 432 on a buffer 416. If it is determined that a write to storage media may affect the master system file 412, the copy 414 and the system file 410 are updated using content from the destination location 432.

Figure 5:
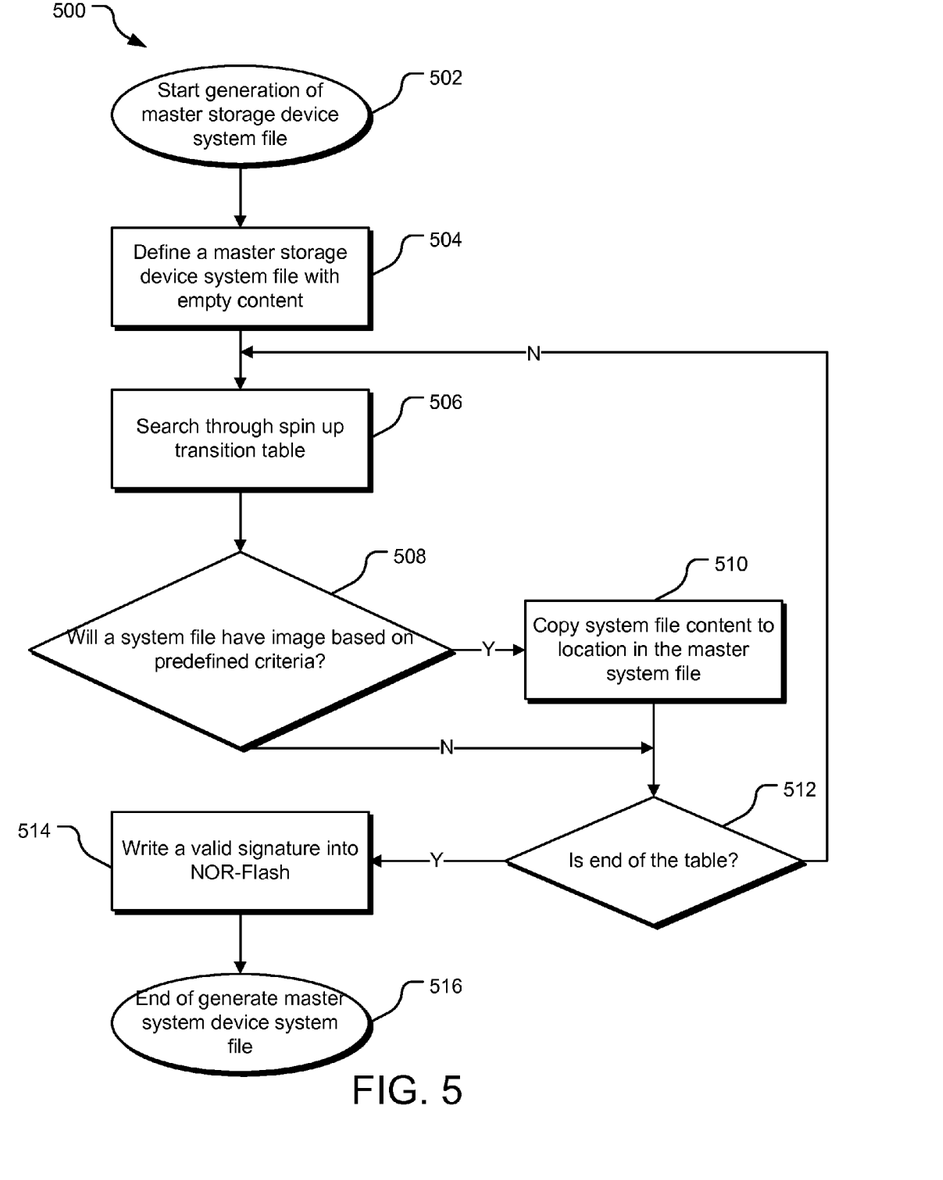
FIG. 5 illustrates alternative example operations for the system for management of system files on a storage device.

FIG. 5 illustrates alternative example operations 500 for the system for management of system files on a storage device. An operation 502 starts generation of a master storage device system file. A defining operation 504 defines the master storage device system file with empty content. For example, the master storage device system file may be defined to be in a system zone of the storage media. An operation 506 searches through a spin up transition table for each of various system files. An operation 508 determines whether a system file will have an image in the master storage device system file. Such decision may be made on one of a plurality of predefined criteria.

If it is determined that an image of a system file is to be created to a master storage device system file, an operation 510 copies the system file from the disc to a location on the master storage device system file. A determining operation 512 determines if there are additional system files. If it is determined that end of the spin up transition table is reached, an operation 514 writes a valid signature into a NOR-flash. The operations for generating the master storage device system file ends at 516.

Figure 6:
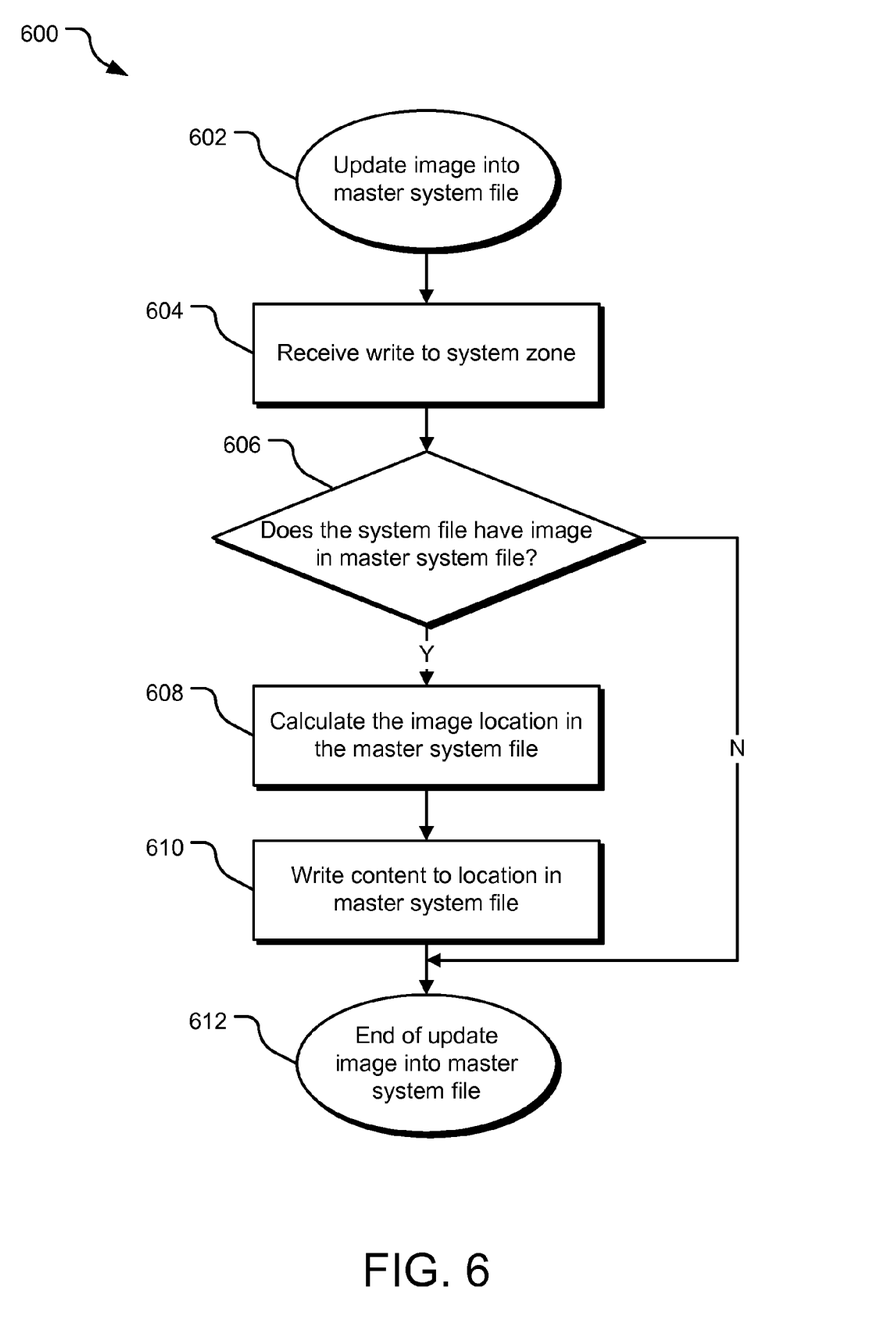
FIG. 6 illustrates yet alternative example operations for the system for management of system files on a storage device.

FIG. 6 illustrates yet alternative example operations 600 for the system for management of system files on a storage device. An operation 602 starts updating an image of master system file. An operation 604 receives a write to a system zone on a storage device during normal operation of a storage device. An operation 606 determines if the system file has an image in the master system file. If it is determined that the system file has an image in the master system file, an operation 608 calculates the location of an image of the master system file and an operation 610 writes the content of the system file from a buffer to the determined location of the image of the master system file. The operations end at 612.

Figure 7:
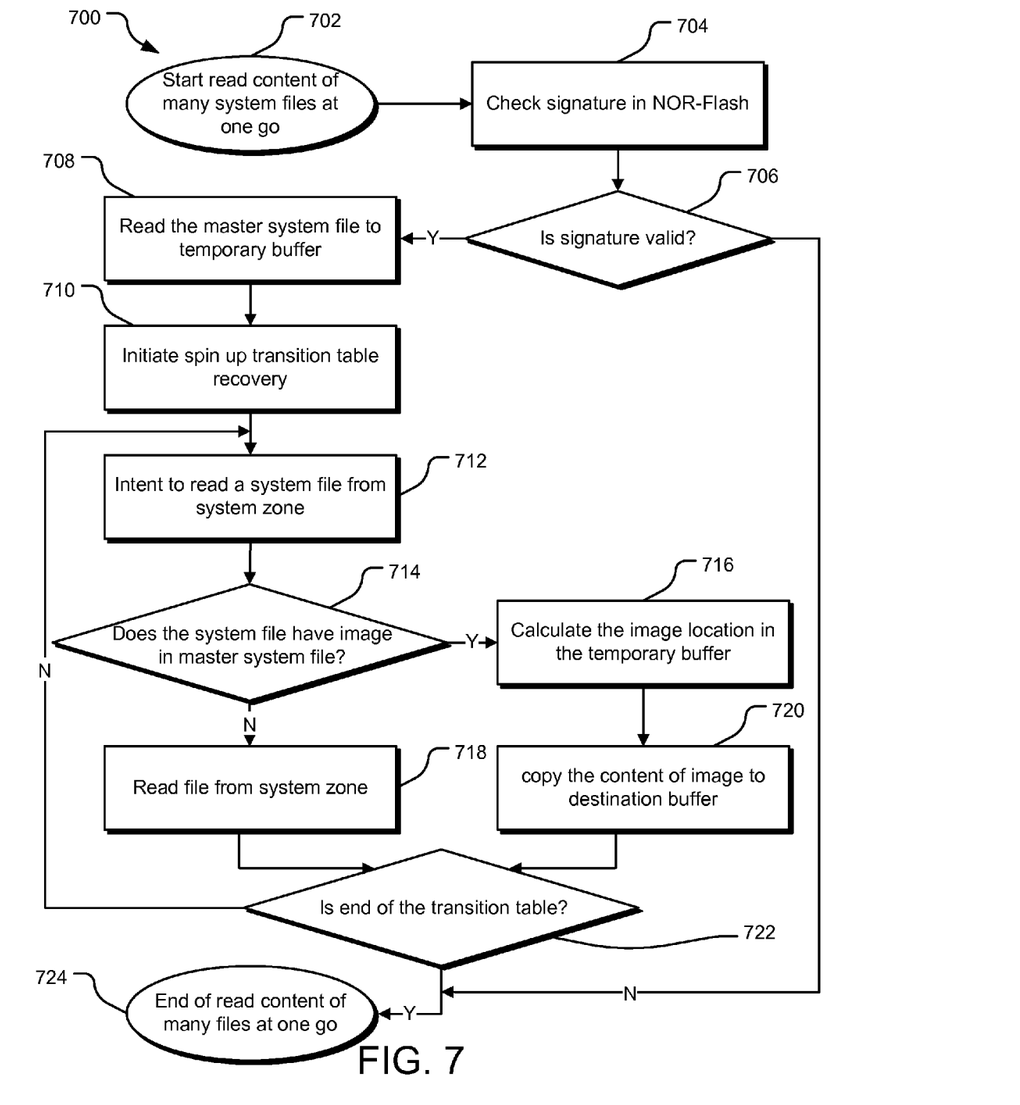
FIG. 7 illustrates yet alternative example operations 700 for the system for management of system files on a storage device.

FIG. 7 illustrates yet alternative example operations 700 for the system for management of system files on a storage device. At 702 the operations to read content of many system files at one go start. An operation 704 checks a signature in a register or in a NOR-Flash in the storage device processor. If a determining operation 706 determines that the signature is valid, which indicates that a master system file is stored on the storage media, an operation 708 reads the master system file to a temporary buffer.

An operation 710 initiates a spin up transition table recovery. An operation 712 indicates an intent to read a system file from a system zone of the storage device. A determining operation 714 determines if the system file has an image in a master system file. If so, an operation 716 calculates the location of the master system file in a temporary buffer and an operation 720 copies the content of the image of the system file from the temporary buffer to a destination buffer. If the operation 714 determines that there is no image of the system file in the master system file, an operation 718 reads the system file from its location on system zone. If a determining operation 722 determines that it is an end of a transition table, the operations to read content of may system files at one go ends at 724.

The implementations described herein may be implemented as logical steps in one or more computer systems.

The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   reading content of a plurality of system files from storage media of a storage device, locations of the plurality of system files determined using a transition table containing a plurality of entries, each entry of the plurality of entries corresponding to a system file of the plurality of system files and identifying a location of the system file;
   generating a master storage device system file based on the content of the plurality of system files;
   storing the master storage device system file on the storage media at a master system file location;
   storing, during boot up of the storage device, the master storage device system file to a temporary buffer responsive to determining that the master storage device system file is created; and
   copying at least one system file from the temporary buffer to one or more destination buffers responsive to determining that the at least one system file of the plurality of system files includes an image in the master storage device system file stored in the temporary buffer.

2. The method of claim 1, wherein storing the master storage device system file further comprises storing the master storage device system file on a system zone of the storage media.

3. The method of claim 1, further comprising providing a location of the master storage device system file to a system on chip (SoC) boot firmware.

4. The method of claim 1, wherein upon determining that the master storage device system file is not created, reading content from one or more of the plurality of system files.

5. The method of claim 1, further comprising:
   determining a size of the master storage device system file; and determining a location of the master storage device system file based on the size of the master storage device system file.

6. The method of claim 1, further comprising:
upon receiving a command to write a block to a write destination on a system zone of the storage media:
determining a starting location of the write destination and a length of the block; and
determining if writing the block may overwrite at least a part of the master storage device system file based on the starting location and the length.

7. The method of claim 6, if writing the block may overwrite at least the part of the master storage device system file, writing the content of the master storage device system file to an alternative image location.

8. The method of claim 1, further comprising:
determining that a signature is valid, the valid signature indicating that the master storage device system file is stored on the storage media.

9. A storage device comprising:
a storage media, and
a storage controller configured to:
read content of a plurality of system files from storage media of the storage device, locations of the plurality of system files determined using a transition table containing a plurality of entries, each entry of the plurality of entries corresponding to a system file of the plurality of system files and identifying a location of the system file;
generate a master storage device system file based on the content of the plurality of system files;
store the master storage device system file on the storage media at a master system file location;
store, during boot up of the storage device, the master storage device system file to a temporary buffer responsive to determining that the master storage device system file is created; and
copy at least one system file from the temporary buffer to one or more destination buffers responsive to determining that the at least one system file of the plurality of system files includes an image in the master storage device system file stored in the temporary buffer.

10. The storage device of claim 9, wherein the storage controller is further configured to store the master storage device system file on a system zone of the storage media.

11. The storage device of claim 9, wherein the storage controller is further configured to provide the master system file location to a system on chip (SoC) boot firmware.

12. The storage device of claim 9, wherein the storage controller is further configured to:
receive a command to write a block to a write destination on a system zone of the storage media and upon the receipt, determine a starting location of the write destination and a length of the block and determine if writing the block may overwrite at least a part of the master storage device system file based on the starting location and the length.

13. A system comprising:
a storage media configured to store data; and
a storage controller including a processor and tangible computer readable media with computer executable instructions to perform a method of:
reading content of a plurality of system files from storage media of a storage device, locations of the plurality of system files determined using a transition table containing a plurality of entries, each entry of the plurality of entries corresponding to a system file of the plurality of system files and identifying a location of the system file;
generating a master storage device system file based on the content of the plurality of system files;
storing the master storage device system file on a system zone of the storage media at a master storage device system file location;
storing, during boot up of the storage device, the master storage device system file to a temporary buffer responsive to determining that the master storage device system file is created; and
copying at least one system file from the temporary buffer to one or more destination buffers responsive to determining that the at least one system file of the plurality of system files includes an image in the master storage device system file stored in the temporary buffer.

14. The system of claim 13, wherein the method further comprising providing the master storage device system file location to a system on chip (SoC) boot firmware.

15. The system of claim 13, wherein the method further comprising determining on execution of a boot sequence whether a master storage device system file is created.

* * * * *